United States Patent
Akiyoshi et al.

(10) Patent No.: US 9,509,608 B2
(45) Date of Patent: Nov. 29, 2016

(54) COMMUNICATION TERMINAL, COMMUNICATION METHOD, COMMUNICATION SYSTEM, AND PROGRAM

(75) Inventors: Ippei Akiyoshi, Tokyo (JP); Yasuhiro Mizukoshi, Tokyo (JP); Nobuhiko Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 158 days.

(21) Appl. No.: 14/241,138

(22) PCT Filed: Aug. 31, 2012

(86) PCT No.: PCT/JP2012/005524
§ 371 (c)(1),
(2), (4) Date: Feb. 26, 2014

(87) PCT Pub. No.: WO2013/031233
PCT Pub. Date: Mar. 7, 2013

(65) Prior Publication Data
US 2014/0198798 A1    Jul. 17, 2014

(30) Foreign Application Priority Data
Sep. 1, 2011  (JP) ................................. 2011-190294

(51) Int. Cl.
*H04L 12/741*   (2013.01)
*H04L 29/12*    (2006.01)
(Continued)

(52) U.S. Cl.
CPC ............. *H04L 45/745* (2013.01); *H04L 41/00* (2013.01); *H04L 45/38* (2013.01); *H04L 61/20* (2013.01); *H04L 61/25* (2013.01); *H04W 76/02* (2013.01); *H04W 8/26* (2013.01)

(58) Field of Classification Search
None
See application file for complete search history.

(56) References Cited

U.S. PATENT DOCUMENTS

| 8,725,898 B1 * | 5/2014 | Vincent ............... H04L 61/2061 709/238 |
| 2008/0002686 A1 | 1/2008 | Valli et al. |
| 2010/0208698 A1 | 8/2010 | Lu et al. |

(Continued)

FOREIGN PATENT DOCUMENTS

| JP | 2008-098937 | 4/2008 |
| JP | 2011-139430 | 7/2011 |
| WO | WO 2008/095010 A1 | 8/2008 |

OTHER PUBLICATIONS

CATT, Pseudo-CR on ANDSF IP address provision in the PCO, 3GPP TSG CT WG1 Meeting #56, C1-084761, Nov. 2008.

(Continued)

*Primary Examiner* — Ashley Shivers
(74) *Attorney, Agent, or Firm* — Finnegan, Henderson, Farabow, Garrett & Dunner LLP

(57) ABSTRACT

A communication terminal communicating with a network including a control apparatus that generates a processing rule defining a packet processing method, the communication terminal comprises: a request unit that requests an address of the control apparatus when requesting for establishing a connection to the network; a communication unit that establishes a communication channel to the control apparatus based on an address acquired by the address request; and a processing unit that processes a packet based on a processing rule transmitted by the control apparatus via the communication channel.

22 Claims, 11 Drawing Sheets

(51) Int. Cl.
 *H04W 76/02* (2009.01)
 *H04L 12/721* (2013.01)
 *H04L 12/24* (2006.01)
 *H04W 8/26* (2009.01)

(56) References Cited

U.S. PATENT DOCUMENTS

| | | | |
|---|---|---|---|
| 2011/0103283 A1* | 5/2011 | Kale | H04L 12/189 370/312 |
| 2011/0171953 A1 | 7/2011 | Faccin et al. | |
| 2012/0014317 A1* | 1/2012 | Rahman | H04W 88/16 370/328 |
| 2013/0007257 A1* | 1/2013 | Ramaraj | H04L 63/0263 709/224 |

OTHER PUBLICATIONS

P. Loureiro et al., "Policy Routing Architecture for IP Flow Mobility in 3GPP's Evolved Packet Core", Globecom Workshops (GC WKSHPS), pp. 2000-2005, Dec. 2010.

Extended European Search Report mailed on Jul. 7, 2015 by the European Patent Office in counterpart European Patent Application No. 12828223.3.

Nick McKeown et al., "OpenFlow: Enabling Innovation in Campus Networks", <URL: http:/www.openflowswitch.org/documents/openflow-wp-latest.pdf>, Mar. 14, 2008.

"OpenFlow Switch Specification", Version 1.1.0 Implemented (Wire Protocol 0 × 02), <URL: http://www.openflowswitch.org/documents/openflow-spec-v1.1.0.pdf>, Feb. 28, 2011.

International Search Report and Written Opinion mailed Sep. 25, 2012.

\* cited by examiner

Fig. 3

| MATCHING RULE | PROCESSING METHOD |
|---|---|
| FLOW #A | FORWARD TO HIGHER PROTOCOL STACK OF COMMUNICATION TERMINAL |
| FLOW #B | FORWARD TO LOGICAL CHANNEL UNDER CONSTRUCTION WITH COMMUNICATION NETWORK |
| ... | |

PROCESSING RULE

Fig. 11

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

Header Fields; MATCHING RULE (bracket spans In Port through TCP/UDP dst port)

COMMUNICATION TERMINAL, COMMUNICATION METHOD, COMMUNICATION SYSTEM, AND PROGRAM

REFERENCE TO RELATED APPLICATION

This application is a National Stage Entry of International Application No. PCT/JP2012/005524, filed on Aug. 31, 2012, which is based upon and claims the benefit of priority from Japanese patent application No. 2011-190294 filed on Sep. 1, 2011. The entire contents of the above-referenced applications are expressly incorporated herein by reference.

TECHNICAL FIELD

The present invention relates to a communication terminal, communication method, communication system, and program, and particularly to a communication terminal, communication method, communication system, and program in a network centrally controlled by a control apparatus.

BACKGROUND

In recent years, centrally controlled network architectures have been proposed. As an example of a centrally controlled network architecture, there is a technology called OpenFlow (refer to Patent Literature (PTL) 1 and Non Patent Literatures (NPL) 1 and 2).

OpenFlow treats communication as an end-to-end flow, and performs path control, failure recovery, load balancing, and optimization for each flow. An OpenFlow switch specified in Non Patent Literature 2 comprises a secure channel for communicating with an OpenFlow controller that corresponds to a control apparatus, and operates according to a flow table given an appropriate instruction of addition or rewrite by an OpenFlow controller. In the flow table, a set of a packet matching rule (header fields) that matches a packet header, flow statistics (Counters), and an action (Actions) that defines a processing content is defined for each flow (refer to FIG. 11).

Upon receiving a packet, the OpenFlow switch searches an entry having a matching rule (refer to the header fields in FIG. 11) that matches the header information of the received packet in the flow table. When an entry matching the received packet is found as a result, the OpenFlow switch updates the flow statistics (Counter) and performs the processing content (packet transmission from a designated port, flooding, discard, etc.) written in the action field of the entry on the received packet. Meanwhile, when no entry matching the received packet is found as a result of the search, the OpenFlow switch forwards the received packet to the Open-Flow controller via the secure channel, requesting the controller to determine the path of the packet based on the source/destination of the received packet, receives a flow entry realizing this, and updates the flow table. As described, the OpenFlow switch forwards packets using entries stored in the flow table as processing rules.

PTL 1:
WO Publication No. WO2008/095010
NPL 1:
McKeown, Nick, et al., "OpenFlow: Enabling Innovation in Campus Networks," [online], [searched on Aug. 16, 2011], the Internet <URL:
http://www.openflowswitch.org/documents/openflow-wp-latest. pdf>
NPL 2:
"OpenFlow Switch Specification" Version 1.1.0 Implemented (Wire Protocol 0x02), [online], [searched on Aug. 16, 2011], the Internet <URL:
http://www.openflowswitch.org/documents/openflow-spec-v1.1.0.pdf>

SUMMARY

The following analysis is given by the present invention.
In a centrally controlled network architecture, devices such as switches and routers constituting the network must establish a control communication channel to a control apparatus (controller) that centrally controls these devices.

However, documents listed above (Patent Literature 1, and Non Patent Literatures 1 and 2) do not describe any method for checking an address of the control apparatus in order to establish the control communication channel. In the related technologies above, for instance, devices such as switches and routers establish the control communication channel based on an address of the control apparatus statically configured in these devices.

Further, devices controlled by the control apparatus may include not only switches and routers, but also communication terminals in the future. A communication terminal changes the network it accesses as it changes its location. Each time the network is changed, the communication terminal needs to change the control apparatus that establishes the communication channel. However, since the related technologies listed above do not describe any method for checking an address of the control apparatus, it is difficult for the communication terminal to change the control apparatus establishing the communication channel.

Therefore, there is a need in the art to make it possible to establish a communication channel between a control apparatus that centrally controls a network and a communication terminal even when the communication terminal changes the network it accesses.

According to a first aspect of the present disclosure, there is provided a communication terminal, which communicates with a network including a control apparatus that generates a processing rule defining a packet processing method, the communication terminal comprising:
a request unit that requests an address of the control apparatus when requesting for establishing a connection to the network;
a communication unit that establishes a communication channel to the control apparatus based on an address acquired by the address request; and
a processing unit that processes a packet based on a processing rule transmitted by the control apparatus via the communication channel.

According to a second aspect of the present disclosure, there is provided a communication method, in which a communication terminal is used that communicates with a network including a control apparatus that generates a processing rule defining a packet processing method, the method comprising:
requesting an address of the control apparatus when requesting for establishing a connection to the network;
establishing a communication channel to the control apparatus based on an address acquired by the address request; and
processing a packet based on a processing rule transmitted by the control apparatus via the communication channel.

According to a third aspect of the present disclosure, there is provided a communication system comprising:
a network including a control apparatus that generates a processing rule defining a packet processing method; and
a communication terminal that communicates with the network;
the communication terminal further comprising:
a request unit that requests an address of the control apparatus when requesting for establishing a connection to the network;
a communication unit that establishes a communication channel to the control apparatus based on an address acquired by the address request; and
a processing unit that processes a packet based on a processing rule transmitted by the control apparatus via the communication channel.

According to a fourth aspect of the present disclosure, there is provided a program causing a computer built into a communication terminal that communicates with a network including a control apparatus that generates a processing rule defining a packet processing method to execute:
requesting an address of the control apparatus when requesting for establishing a connection to the network;
establishing a communication channel to the control apparatus based on an address acquired by the address request; and
processing a packet based on a processing rule transmitted by the control apparatus via the communication channel.

The program may be provided as a program product recorded on a non-transitory computer-readable storage medium.

The present invention provides the following advantage, but not restricted thereto. According to the present disclosure, even when changing the network to access, a communication terminal is able to establish a communication channel to a control apparatus that centrally controls the network without resetting the address of the control apparatus in the communication terminal.

BRIEF DESCRIPTION OF THE DRAWINGS

FIG. 3 is a drawing for explaining an operation example of the communication terminal relating to the first exemplary embodiment.

FIG. 11 is a drawing showing information held by a flow table provided in an OpenFlow switch as an example.

PREFERRED MODES

Figure 1:
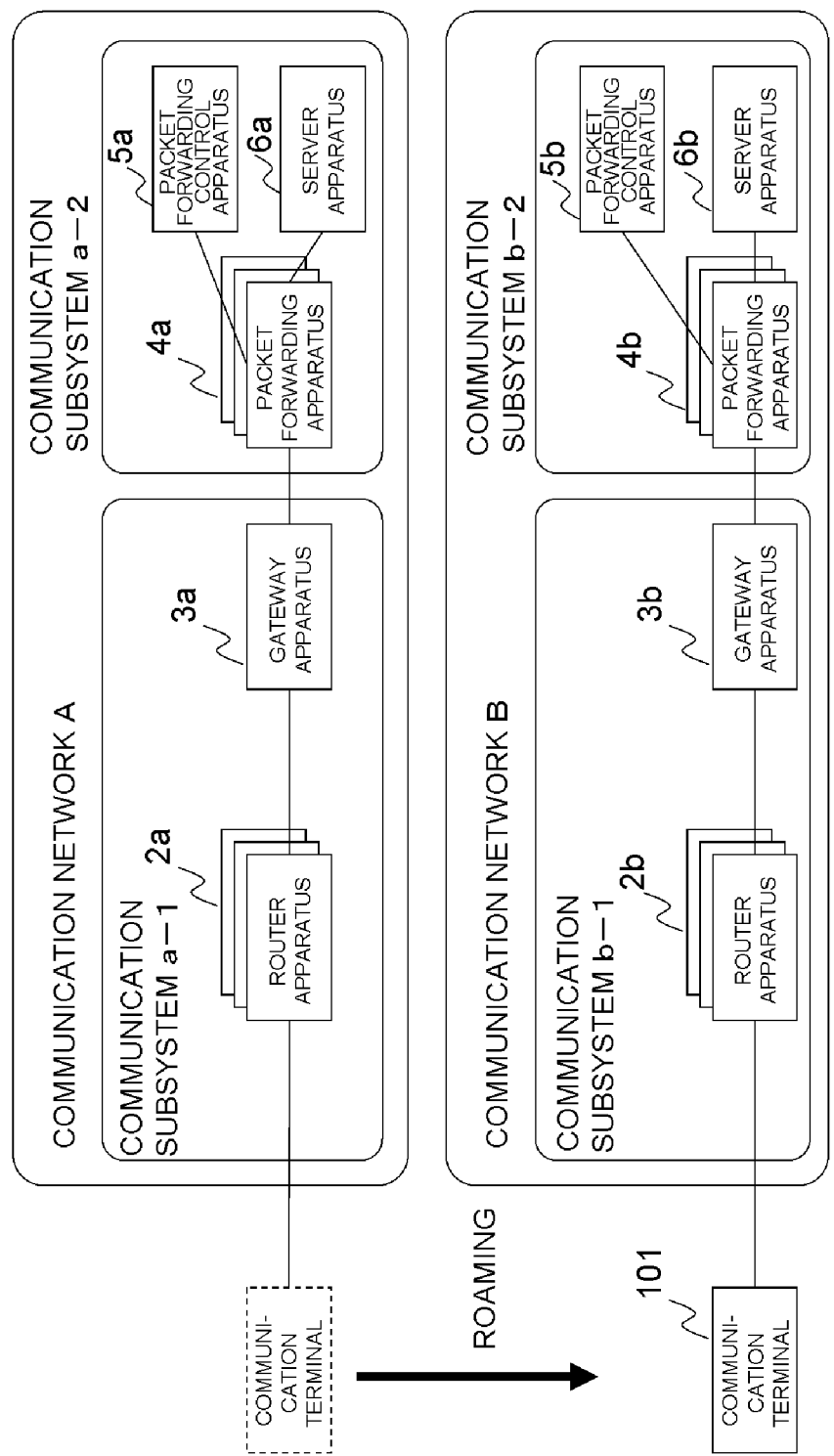
FIG. 1 is a block diagram showing a configuration example of a communication system having a communication terminal relating to a first exemplary embodiment.

In the present disclosure, there are various possible modes, which include the following, but not restricted thereto. First, a summary of the present disclosure will be given. Note that the drawing reference signs used in the summary are given solely to facilitate understanding and not to limit the present disclosure to the illustrated aspects.

Figure 2:
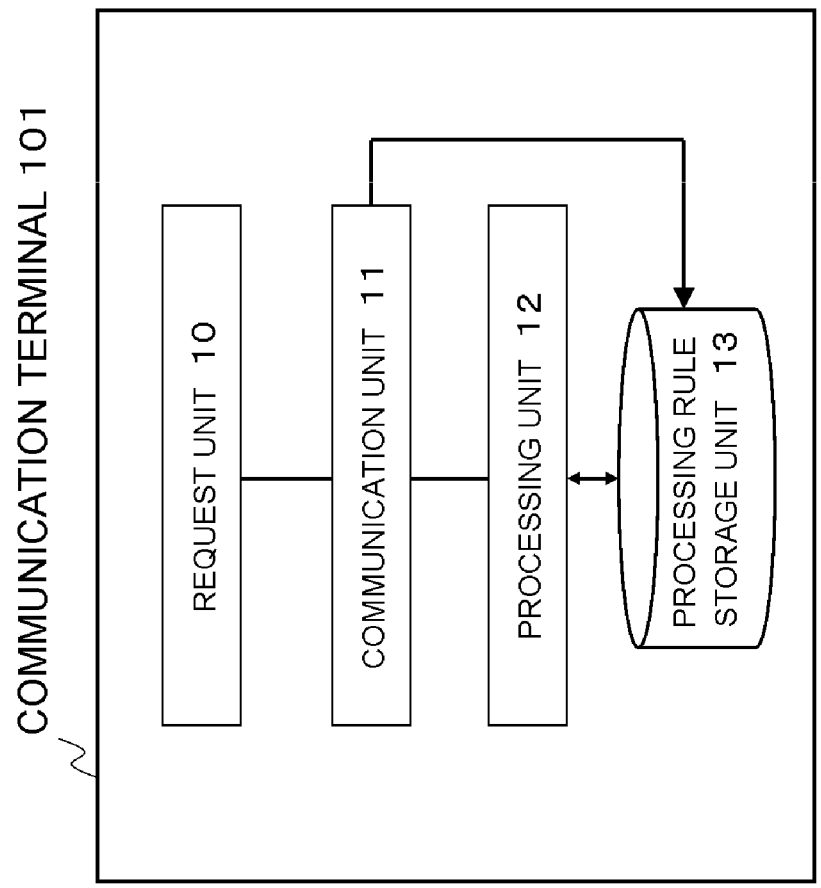
FIG. 2 is a block diagram showing a configuration example of the communication terminal relating to the first exemplary embodiment.

In FIGS. 1 and 2, a communication terminal (101) communicates with a network (communication subsystem a-2) that includes a control apparatus (packet forwarding control apparatus 5a) that generates a processing rule defining a packet processing method, and comprises a request unit (10) that requests an address of the control apparatus (5a) when requesting for establishing a connection with the communication subsystem a-2, a communication unit (11) that establishes a communication channel to the control apparatus (5a) based on the address acquired by the address request, and a processing unit (12) that processes a packet based on a processing rule transmitted from the control apparatus (5a) via the communication channel.

The request unit (10) may acquire the address of the control apparatus (5a) from a response to the request for establishing a connection with the communication subsystem a-2.

The communication unit (11) may release the address according to a predetermined condition. The communication unit (11) may release the address when the communication terminal (101) moves from a first network (communication network A) to a second network (communication network B). Further, the communication unit (11) may release the address when the communication terminal (101) disconnects a connection with the network (A). Moreover, the communication unit (11) may determine whether or not to release the address according to a cause for disconnecting a connection with the network (A).

The processing unit (12) may release at least one of the processing rules set by the control apparatus (5a) according to a predetermined condition. The processing unit (12) may release the processing rule set by the control apparatus (5a) belonging to the first network (A) when the communication terminal (101) moves from the first network (A) to the second network (B). Further, the processing unit (12) may release the processing rule set by the control apparatus (5a) belonging to the first network (A) when the communication terminal (101) disconnects a connection with the network (A). Moreover, the processing unit (12) may determine whether or not to release the processing rule according to a cause for disconnecting a connection with the network (A).

The request unit (10) may notify whether or not the communication terminal (101) hold the address. The request unit (10) may insert into the address request information indicating whether or not the communication terminal (101) holds the address. Further, the request unit (10) may restrain from requesting the address when the communication terminal (101) holds the address.

According to the communication terminal relating to the present disclosure, it becomes possible to establish a communication channel between a control apparatus that centrally controls a network and a communication terminal even when the communication terminal changes the network it accesses.

(First Exemplary Embodiment)

A communication terminal relating to a first exemplary embodiment will be described with reference to the drawings. FIG. 1 is a drawing for explaining an example of an operation of a communication terminal 101 relating to the present exemplary embodiment. Further, a system shown in FIG. 1 illustrates an example of the present disclosure, and the present disclosure is not limited to the system shown in FIG. 1. The communication terminal 101 communicates with a communication network A or B. The communication network A includes communication subsystems a-1 and a-2. Meanwhile, the communication network B includes communication subsystems b-1 and b-2.

The communication subsystem a-1 comprises a router apparatus 2a and a gateway apparatus 3a, and the communication subsystem b-1 comprises a router apparatus 2b and a gateway apparatus 3b. The router apparatuses 2a and 2b forward a packet sent/received to/from the communication terminal 101. The gateway apparatuses 3a and 3b construct a logical channel to the communication terminal 101, and relay between the communication subsystems a-1 and b-1 and the communication terminal 101.

The communication subsystem a-2 comprises a packet forwarding apparatus 4a, a packet forwarding control apparatus 5a, and a server apparatus 6a, and the communication subsystem b-2 comprises a packet forwarding apparatus 4b, a packet forwarding control apparatus 5b, and a server apparatus 6b.

The packet forwarding control apparatuses 5a and 5b centrally control processing such as packet forwarding by the communication terminal 101 and a plurality of packet forwarding apparatuses 4a and 4b. The packet forwarding control apparatuses 5a and 5b control the communication terminal 101 and the packet forwarding apparatus 4a or 4b by, for instance, setting a processing rule defining a processing content for a packet in the communication terminal 101 and the packet forwarding apparatus 4a or 4b. The processing rule includes, for instance, a matching rule for identifying a packet corresponding to this processing rule, and a processing method to be executed on a packet matching this matching rule. Further, the method in which the packet forwarding control apparatuses 5a and 5b control the communication terminal 101 and the packet forwarding apparatus 4a or 4b is not limited to the method described above.

For instance, the packet forwarding apparatuses 4a and 4b comprise a table that holds a processing rule set by the packet forwarding control apparatus 5a or 5b. The packet forwarding apparatuses 4a and 4b search a processing rule corresponding to each packet in the table. The packet forwarding apparatuses 4a and 4b search a processing rule that includes a matching rule matching information included in a packet (for instance, packet header information) in the table. When finding a processing rule that includes an identification condition matching the information included in a packet, the packet forwarding apparatuses 4a and 4b process the packet based on the packet processing method defined in this processing rule. Further, the method in which the packet forwarding apparatuses 4a and 4b process a packet is not limited to the method described above.

The server apparatuses 6a and 6b provide a predetermined service such as a Web service. The service provided by the server apparatuses 6a and 6b is not limited to a Web service, and the server apparatuses 6a and 6b are able to provide various services. For instance, the packet forwarding control apparatuses 5a and 5b control the communication terminal 101 and the packet forwarding apparatus 4a or 4b, and set a communication path between the server apparatus 6a or 6b and the communication terminal 101.

FIG. 2 is a block diagram showing an example of the configuration of the communication terminal 101 in the present exemplary embodiment. The communication terminal 101 comprises, for instance, the request unit 10, the communication unit 11, the processing unit 12, and a processing rule storage unit 13. The communication terminal 101 is a terminal comprising communication functions such as that of a mobile terminal, personal computer, and mobile router. Details will be described later, but the communication terminal 101 is controlled by the packet forwarding control apparatus 5a or 5b as the packet forwarding apparatuses 4a and 4b. Therefore, the communication terminal 101 comprises functions of communicating with the packet forwarding control apparatus 5a and 5b and receiving a processing rule. In order for the communication terminal 101 to communicate with the packet forwarding control apparatus 5a or 5b, the communication terminal 101 must recognize the address of the packet forwarding control apparatus 5a or 5b. Below, an operation example in which the communication terminal 101 acquires the address of the packet forwarding control apparatus 5a will be described.

The request unit 10 requests the communication network A to establish a connection (i.e., logical channel) for communicating with the communication subsystem a-2. For instance, a logical channel is a tunneled connection such as a bearer or VPN (Virtual Private Network) tunnel established in a wireless section between a wireless control station and a mobile station. The request unit 10 requests for an address (such as an IP address) of the packet forwarding control apparatus 5a from the communication network A, in addition to the request for establishing the logical channel.

For instance, when the address of the packet forwarding control apparatus 5a is notified from the communication network A, the request unit 10 sets the notified address in the communication unit 11. For instance, the gateway apparatus 3a notifies the address of the packet forwarding control apparatus 5a in response to the request of the request unit 10. For instance, the gateway apparatus 3a holds the address of the packet forwarding control apparatus 5a in advance and notifies the address in response to the request of the request unit 10. Further, the gateway apparatus 3a notifies the address of the packet forwarding control apparatus 5a in conjunction with a response to the request for establishing the logical channel.

The communication unit 11 establishes a control communication channel to the packet forwarding control apparatus 5a based on the acquired address. The communication unit 11 establishes a secure connection as the control communication channel using a predetermined method. The communication unit 11 receives a processing rule from the packet forwarding control apparatus 5a via the control communication channel. Further, the communication unit 11 requests the packet forwarding control apparatus 5a to set the processing rule via the control communication channel. The communication unit 11 stores the processing rule received from the packet forwarding control apparatus 5a in the processing rule storage unit 13.

When sending/receiving a packet to/from the communication network A or B, the processing unit 12 searches a processing rule corresponding to this packet in the processing rule storage unit 13. When the processing rule corresponding to the packet is stored in the processing rule storage unit 13, the processing unit 12 executes processing that corresponds to the processing rule corresponding to the packet. Meanwhile, when the processing rule storage unit 13 does not store any processing rule corresponding to the packet, for instance, the processing unit 12 requests the packet forwarding control apparatus 5*a* to set a processing rule via the control communication channel. Further, the processing unit 12 is a module obtained by virtualizing OpenFlow switch, which is a related technology listed above, using software.

FIG. 3 shows an example of a processing rule stored in the processing rule storage unit 13. For instance, a processing rule includes a matching rule for checking whether or not a packet matches the processing rule and a packet processing method. FIG. 3 indicates "Flow #A" and "Flow #B" as examples of matching rules. "Flow" denotes a series of packet groups specified by predetermined information such as the destination address and the source address of a packet and a combination of these pieces of information. For instance, "Flow #A" means that a packet having the destination address "A" and the source address "a" matches this matching rule. A packet that matches a matching rule is processed by a processing method corresponding to this matching rule.

When releasing the connection with the communication network, the communication unit 11 may release the address of the packet forwarding control apparatus 5.

Next, with reference to FIGS. 4 and 5, an operation of the communication terminal 101 relating to the present exemplary embodiment will be described. Note that operations shown in FIGS. 4 and 5 are examples, and the operation of the communication terminal 101 relating to the present exemplary embodiment is not limited to what is shown in FIGS. 4 and 5.

Figure 4:
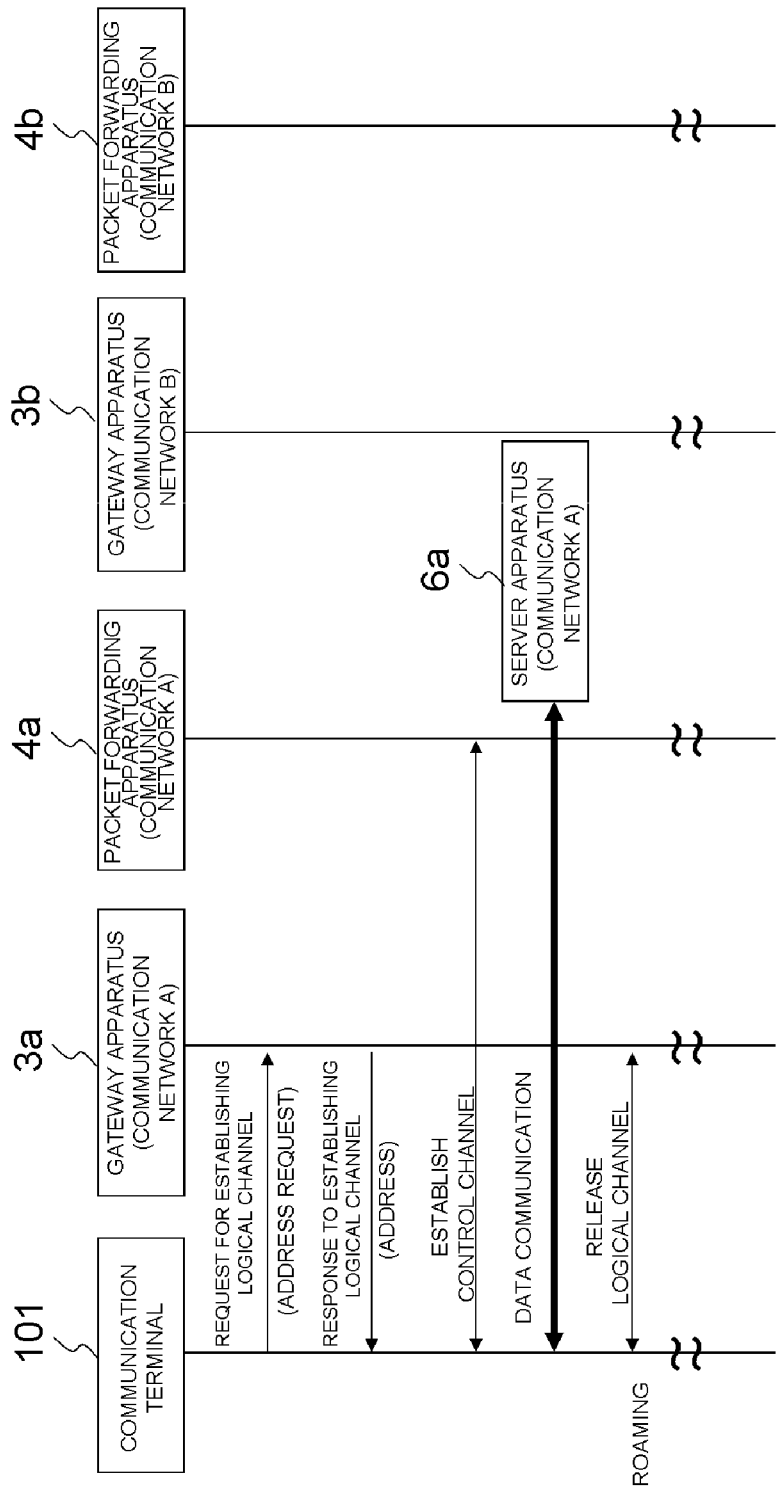
FIG. 4 is a sequence diagram showing an operation example of the communication terminal relating to the first exemplary embodiment.
Figure 5:
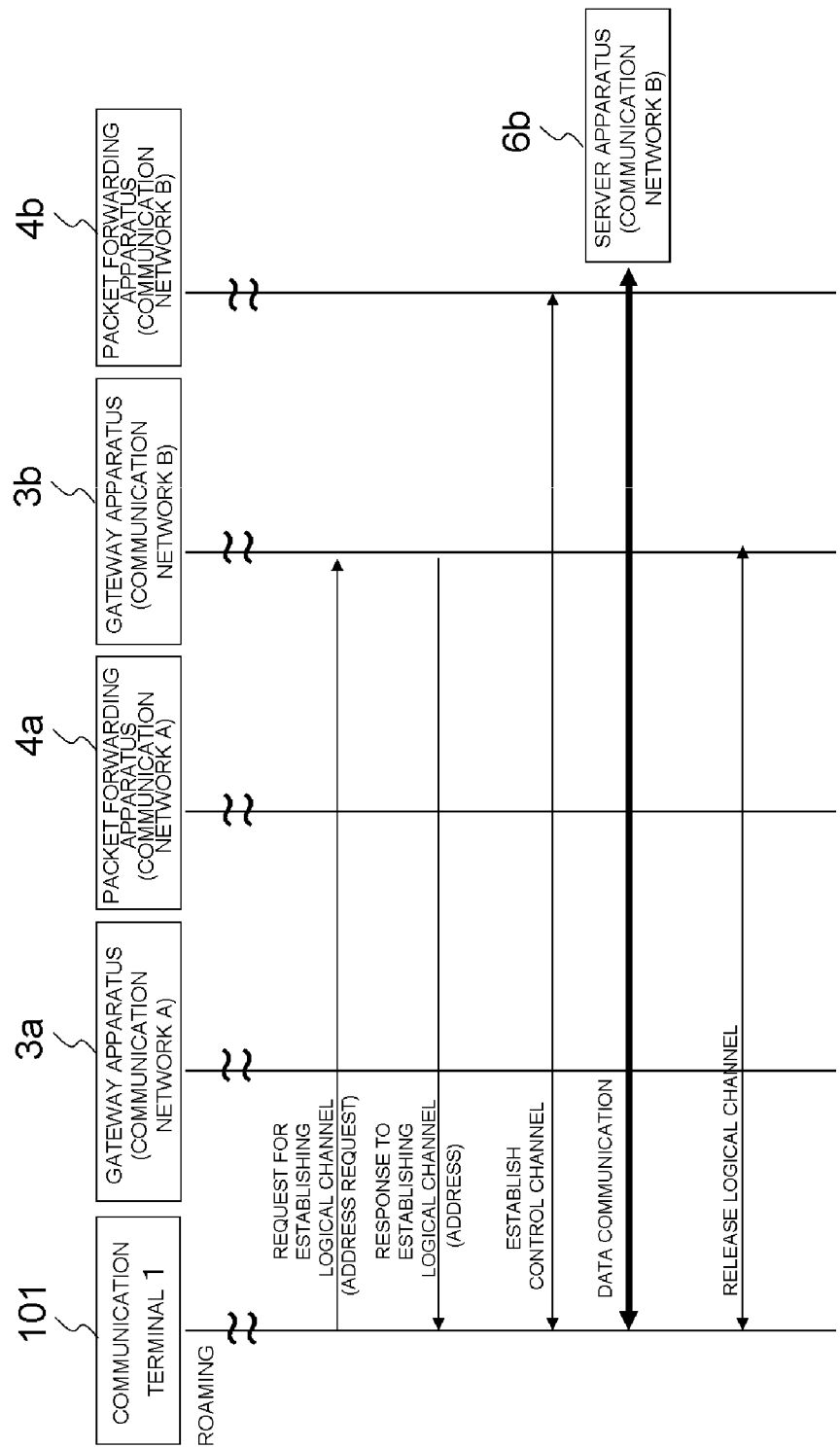
FIG. 5 is a sequence diagram showing an operation example of the communication terminal relating to the first exemplary embodiment.

FIGS. 4 and 5 show operation examples in which the communication terminal 101 roams from the communication network A to the communication network B after communicating with the communication network A, as shown in FIG. 1.

With reference to FIG. 4, when communicating with the communication network A, the communication terminal 101 requests for establishing a logical channel. For instance, the communication terminal 101 requests the gateway apparatus 3*a* of the communication network A to establish a logical channel.

In addition to the request for establishing a logical channel, the communication terminal 101 requests for the address of the packet forwarding control apparatus 5*a* that belongs to the communication network A. The gateway apparatus 3*a* notifies the communication terminal 101 of the address of the packet forwarding control apparatus 5*a* through a response to establishing a logical channel as a response to the address request.

The communication terminal 101 constructs (establishes) a control communication channel to the packet forwarding control apparatus 5*a* based on the notified address.

For instance, the communication terminal 101 performs data communication with the server apparatus 6*a* that belongs to the communication network A based on a processing rule received from the packet forwarding control apparatus 5*a* via the control communication network.

The communication terminal 101 releases the logical channel established between the communication network A and itself at a predetermined timing such as when the data communication has ended. In the example shown in FIG. 4, the communication terminal 101 releases the logical channel when roaming from the communication network A to the communication network B. Further, the communication terminal 101 may release the address of the packet forwarding control apparatus 5*a*, in addition to the logical channel.

FIG. 5 shows an operation example after the communication terminal 101 has roamed to the communication network B. The communication terminal 101 executes the same operation as the operation example described using FIG. 4 with the gateway apparatus 3*b*, the packet forwarding control apparatus 5*b*, and the server apparatus 6*b* that belong to the communication network B.

According to the present disclosure, even when changing the network to access, a communication terminal is able to establish a communication channel to a controller that centrally controls the network without resetting the address of the controller in the communication terminal.

Further, in the present exemplary embodiment, the packet forwarding apparatuses 4*a* and 4*b* and the packet forwarding control apparatus 5*a* and 5*b* may be implemented based on the OpenFlow technology. However, the packet forwarding apparatuses 4*a* and 4*b* and the packet forwarding control apparatus 5*a* and 5*b* may be implemented using a technology other than OpenFlow.

(Second Exemplary Embodiment)

Next, a communication terminal relating to a second exemplary embodiment will be described. The communication terminal of the present exemplary embodiment is a variation of the communication terminal 101 relating to the first exemplary embodiment.

The communication unit 11 may release the address of the packet forwarding control apparatus 5*a* or 5*b* according to a predetermined condition. In the present exemplary embodiment, several examples in which the communication unit 11 releases the address will be illustrated. Note that these are merely examples, and the method in which the communication unit 11 releases the address is not limited to the examples below. Further, the communication unit 11 does not have to release the address.

The communication unit 11 releases the address of the packet forwarding control apparatus 5*a* when the communication terminal 101 roams from the communication network A to the communication network B. When the communication terminal 101 roams to the communication network B, the packet forwarding control apparatus 5*a* that belongs to the communication network A may no longer be an appropriate packet forwarding control apparatus for the communication terminal 101. When the communication terminal 101 roams to the communication network B, the communication terminal 101 may be controlled more appropriately for the communication network B if it communicates with the packet forwarding control apparatus 5*b* that belongs to the communication network B. Therefore, the communication unit 11 releases the address of the packet forwarding control apparatus that it is holding when communicating with another communication network due to roaming. Releasing the address can prevent a processing rule from being set in the communication unit 11 by the packet forwarding control apparatus 5*a* that belongs to the communication network A, the roaming source, and prevent the communication terminal 101 from executing a processing rule inappropriate for the communication network B, the roaming destination.

An example in which the communication unit 11 releases the address of the packet forwarding control apparatus 5*a* that belongs to the communication network A when roaming from the communication network A to B has been described, however, it may be configured that the processing unit 12 releases a processing rule set by the packet forwarding control apparatus 5a of the communication network A in the processing rule storage unit 13.

The communication unit 11 may release the address that it holds when the connection to the communication network to which the communication unit 11 is connected is disconnected. When the connection to the communication network is disconnected, there is a possibility that the communication terminal 101 connects to another communication network due to degradation of communication quality. Therefore, when the connection to the communication network A is disconnected, having the communication unit 11 release the address of the packet forwarding control apparatus 5a can prevent a processing rule from being set in the communication unit 11 by the packet forwarding control apparatus 5a that belongs to the communication network A, the roaming source, and prevent the communication terminal 101 from executing a processing rule inappropriate for the communication network B, the roaming destination.

An example in which the communication unit 11 releases the address of the packet forwarding control apparatus 5a when the connection to the communication network A is disconnected has been described, however, it may be configured that the processing unit 12 releases a processing rule set by the packet forwarding control apparatus 5a that belongs to the communication network A to which the communication unit 11 is connected before the disconnection.

The communication unit 11 may determine whether or not to release the address of the packet forwarding control apparatus 5a based on a main cause of the disconnection when the connection to the communication network A is disconnected. For instance, after the disconnection, the communication terminal 101 retries to connect to the same communication network A. When it is possible to receive a radio wave from the same communication network A at a level where reconnection is possible, the communication terminal 101 recognizes that the connection has been disconnected from the fact that it is temporarily in a coverage hole of the wireless network. In this case, since it is possible for the communication terminal 101 to reconnect to the same communication network A, the address of the packet forwarding control apparatus 5a does not have to be released.

When the communication terminal 101 is unable to receive a radio wave from the same communication network A at a level where reconnection is possible for a predetermined period of time because the distance between a base station of the wireless network and the terminal has increased (such as when it goes into the underground), the communication terminal 101 can assume that this may continue for a long period of time. In this case, the communication terminal 101 may release the address of the packet forwarding control apparatus 5a.

An example in which the communication unit 11 determines whether or not to release the address of the packet forwarding control apparatus 5a based on a main cause of the disconnection has been described, however, the processing unit 12 may determine whether or not to release a processing rule set by the packet forwarding control apparatus 5a that belongs to the communication network A to which the communication terminal 101 was connected before the disconnection.

(Third Exemplary Embodiment)

A communication terminal relating to a third exemplary embodiment will be described. The communication terminal of the present exemplary embodiment is a variation of the communication terminal relating to the first exemplary embodiment.

In the first exemplary embodiment described above, the request unit 10 requests the address of the packet forwarding control apparatus 5a. In the present exemplary embodiment, the request unit 10 transmits information indicating whether or not the communication terminal 101 holds the address of the packet forwarding control apparatus 5a, in addition to the request for establishing a logical channel to the communication network A. Further, the information indicating whether or not the communication terminal 101 holds the address of the packet forwarding control apparatus 5a has, for instance, a flag indicating whether or not the terminal holds the address.

In such a configuration, when responding to the request for establishing a logical channel, the gateway apparatus 3a can notify the address of the packet forwarding control apparatus 5a only when the communication terminal 101 does not hold the address of the packet forwarding control apparatus 5a. In this case, the information amount transmitted in the response to the request for establishing a logical channel can be reduced.

Further, the request unit 10 may refrain from requesting the address of the packet forwarding control apparatus 5a when the communication terminal 101 holds the address of the packet forwarding control apparatus 5a.

(Fourth Exemplary Embodiment)

A communication terminal relating to a fourth exemplary embodiment will be described with reference to the drawings.

In the present exemplary embodiment, the present disclosure is implemented in a 3G (3rd Generation) network.

Figure 6:
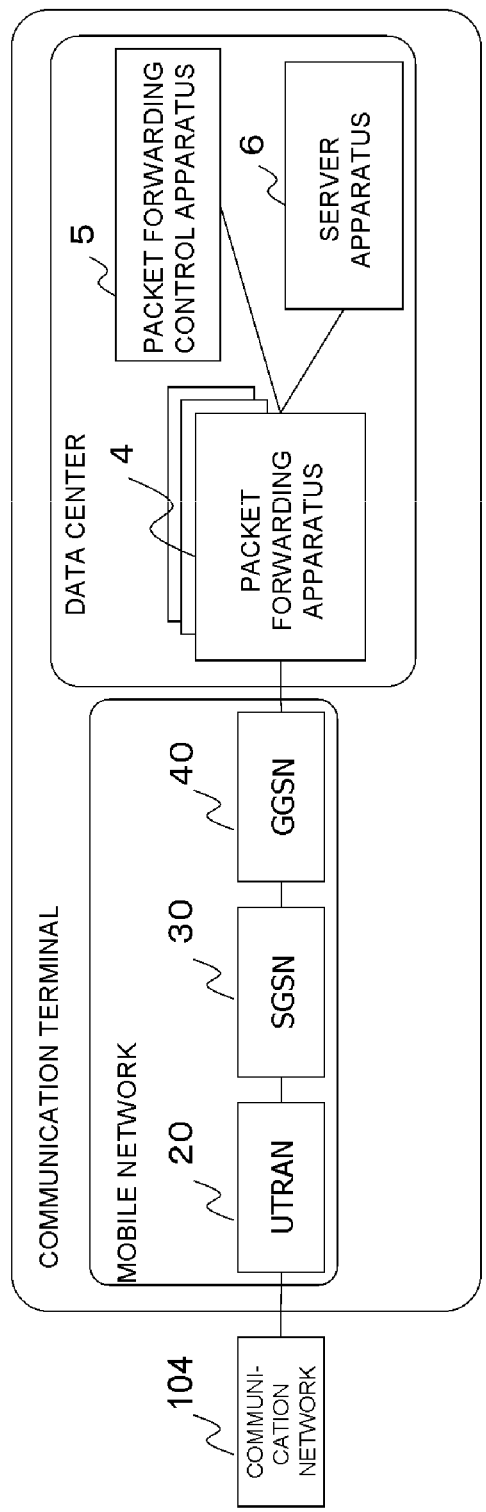
FIG. 6 is a block diagram showing a configuration example of a communication system having a communication terminal relating to a fourth exemplary embodiment.

FIG. 6 shows a system configuration example of the present exemplary embodiment. Note that the configuration shown in FIG. 6 is an example, and the present disclosure is not limited to the configuration shown in FIG. 6.

A communication network, which a communication terminal 104 communicates with, includes a mobile network and a data center. The mobile network comprises a UTRAN 20, an SGSN 30, and a GGSN 40. The data center includes a packet forwarding apparatus 4, a packet forwarding control apparatus 5, and a server apparatus 6.

The UTRAN (UMTS Terrestrial Radio Access Network) 20 is a wireless network comprising a base station and an RNC (Radio Network Controller). The UTRAN 20 is a wireless network that connects between the communication terminal 104 and a core network. The core network connects the communication terminal 104 conforming to a 3G communication standard such as WCDMA (Wideband Code Division Multiple Access) to an external network such as the Internet.

The SGSN (Serving GPRS Support Node) 30 is a part of the aforementioned core network. The SGSN 30 executes routing of packet communication of the communication terminal 104, mobility management (attach/detach to/from the wireless communication network, location management, etc.) of the communication terminal 104, management of a logical channel between the communication terminal 104 and the network, and authentication processing.

The GGSN (Gateway GPRS Support Node) 40 is a part of the aforementioned core network. The GGSN 40 relays communication with an external packet communication network. In the example of FIG. 6, the GGSN 40 relays communication with the data center.

Since the packet forwarding apparatus 4, the packet forwarding control apparatus 5, and the server apparatus 6 are the same as in the first exemplary embodiment described above, explanation of them will be omitted.

Figure 7:
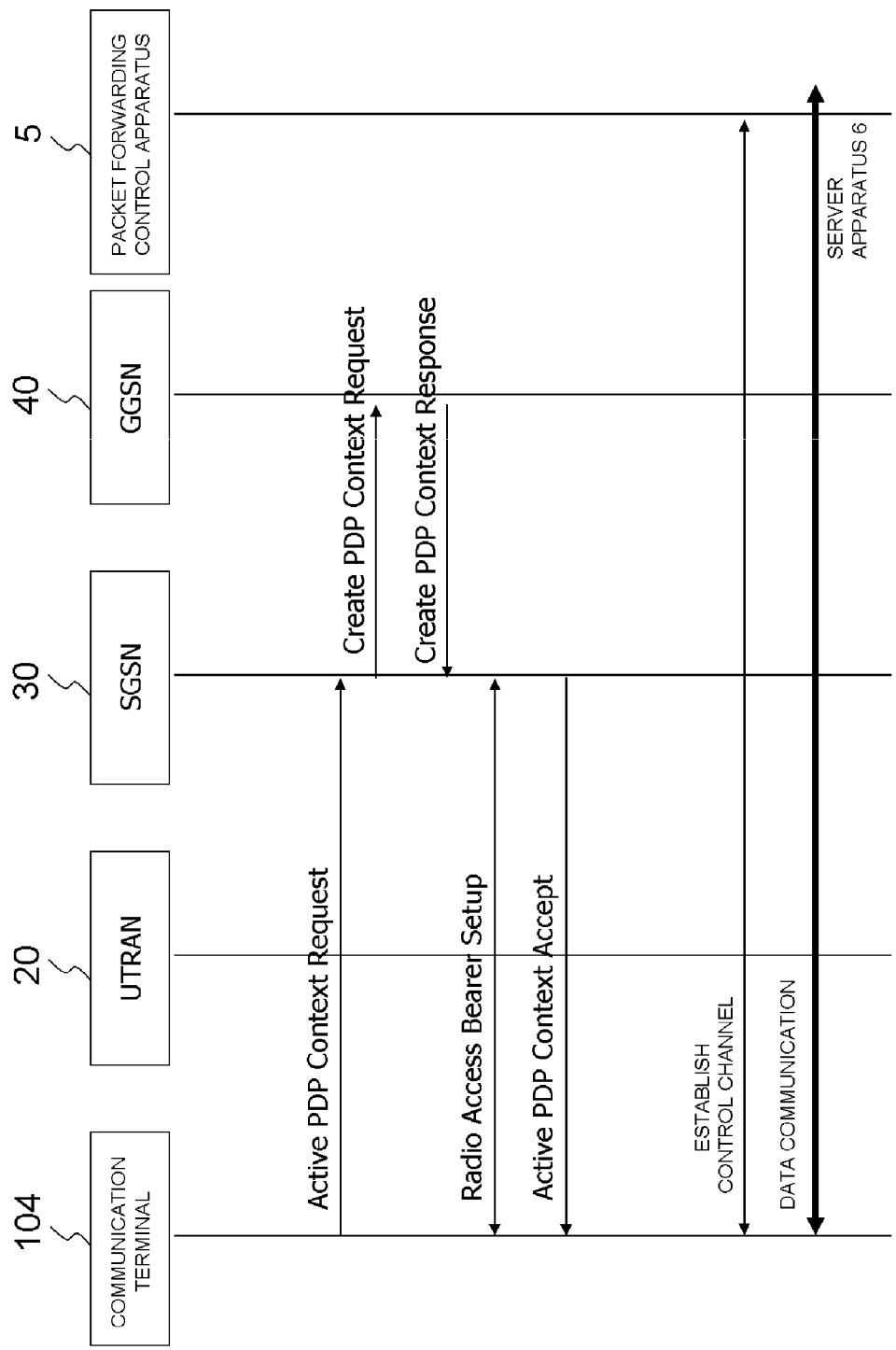
FIG. 7 is a sequence diagram showing an operation example of the communication system relating to the fourth exemplary embodiment.

With reference to FIG. 7, an operation example of the communication terminal 104 relating to the present exemplary embodiment will be described. Note that the operation shown in FIG. 7 is an example, and the present disclosure is not limited to the operation in FIG. 7.

The communication terminal 104 transmits an "Active PDP (Packet Data Protocol) Context Request" message to the SGSN 30, a wireless network to which the communication terminal 104 belongs, via the UTRAN 20. Note that "PDP Context" is status information on the path configuration of a logical packet forwarding path from the communication terminal 104 to the GGSN in a packet data network in 3G communication standards. This message includes the APN (Access Point Name) of the ISP (Internet Service Provider), to which the communication terminal 104 sends a connection request and connects. The APN is used as information for identifying the ISP. Further, in the present exemplary embodiment, the communication terminal 104 requests a connection to the data center in FIG. 6, and this data center corresponds to the ISP. In the present exemplary embodiment, the communication terminal 104 includes the request for acquiring the address of the packet forwarding control apparatus 5 in the Active PDP Context Request message and transmits the message. Upon receiving the Active PDP Context Request, the SGSN 30 determines the GGSN 40 to be connected based on the APN included in the message. The SGSN 30 transmits a Create PDP Context Request message to the GGSN 40.

Upon receiving the Create PDP Context Request, the GGSN 40 executes predetermined processing (for instance, generating a PDP Context) for connecting the communication terminal 104 and the ISP. The GGSN 40 returns the generated PDP Context to the SGSN 30 as a Create PDP Context Response message. Further, in the present exemplary embodiment, the GGSN 40 includes the address of the packet forwarding control apparatus 5 in the Create PDP Context Response and returns it to the SGSN 30. For instance, the GGSN 40 holds the address of the packet forwarding control apparatus 5 by means of a procedure such as acquiring the address by communicating with the packet forwarding control apparatus 5 in advance.

The SGSN 30 receives the Create PDP Context Response and sets up a logical channel for executing packet forwarding between the communication terminal 104 and the communication network (Radio Access Bearer Setup). The SGSN 30 returns an Active PDP Context Accept message to the communication terminal 104. The SGSN 30 includes the address of the packet forwarding control apparatus 5 in this message and transmits the message to the communication terminal 104.

The communication terminal 104 executes communication with the data center in the operation described above. The communication terminal 104 sets up a control communication channel to the packet forwarding control apparatus 5 based on the acquired address of the packet forwarding control apparatus 5. The packet forwarding control apparatus 5 sets a predetermined processing rule in the communication terminal 104 through this control communication channel.

(Fifth Exemplary Embodiment)

A communication terminal relating to a fifth exemplary embodiment of the present disclosure will be described with reference to the drawings.

In the present exemplary embodiment, the present disclosure is implemented in an LTE (Long Term Evolution) network.

Figure 8:
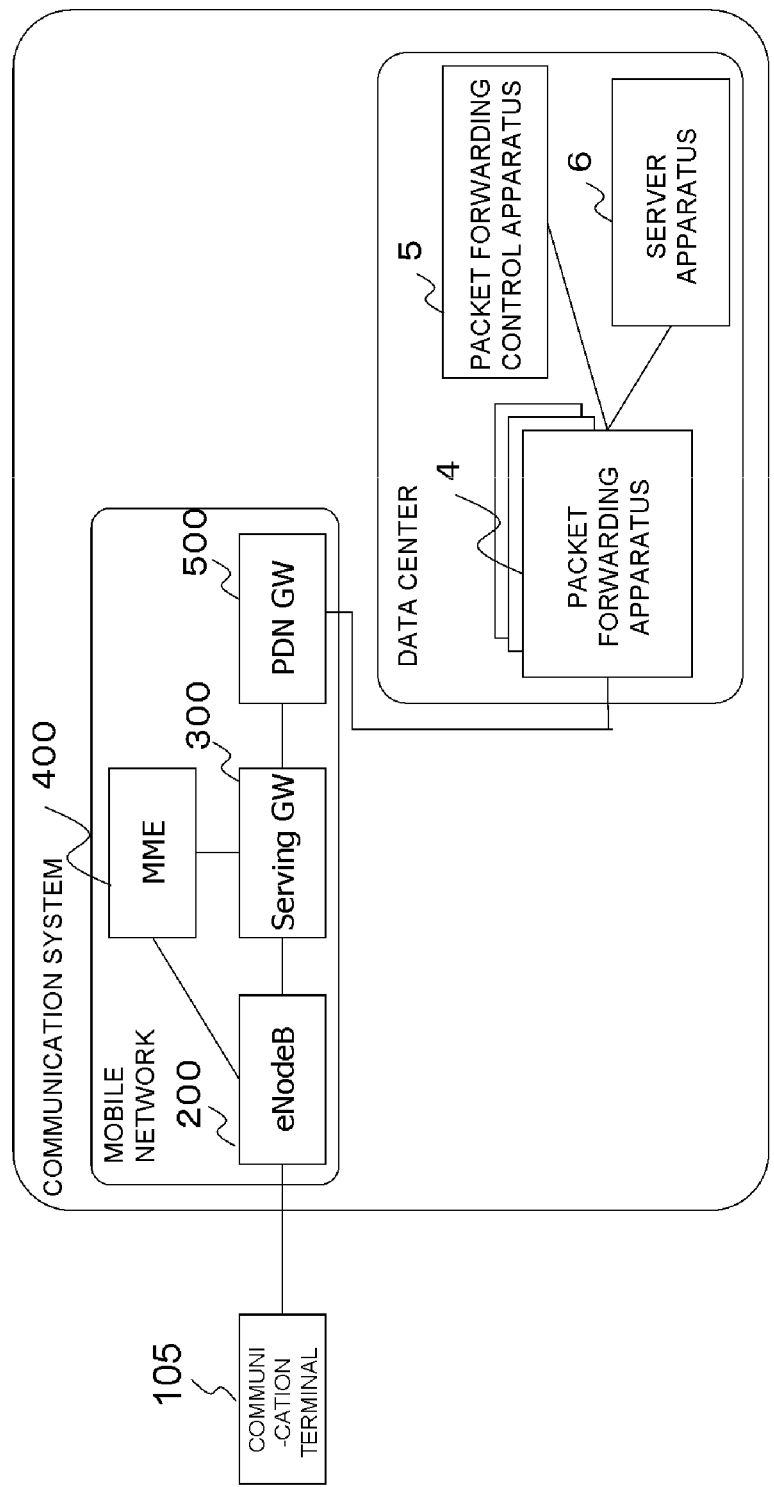
FIG. 8 is a block diagram showing a configuration example of a communication system having a communication terminal relating to a fifth exemplary embodiment.

FIG. 8 shows a system configuration example of the present exemplary embodiment. Note that the configuration shown in FIG. 8 is an example, and the present disclosure is not limited to the configuration shown in FIG. 8.

A communication network, which a communication terminal 105 communicates with, includes a mobile network and a data center. The mobile network comprises an eNodeB 200, a Serving GW (Gateway) 300, an MME (Mobility Management Entity) 400, and a PDN (Packet Data Network) GW 500. The data center comprises the packet forwarding apparatus 4, the packet forwarding control apparatus 5, and the server apparatus 6.

The eNodeB 200 functions as an interface between the communication terminal 105 and a wireless network. Further, the eNodeB 200 has functions of radio resource management and radio resource scheduling.

The Serving GW 300 routes and forwards a data packet.

The MME 400 is a control node in the LTE network. The MME 400 executes mobility management such as location registration of the communication terminal 105, calling, and handover between the eNodeBs 200.

The PDN GW 500 functions as a gateway to an external network. For instance, in the LTE network in FIG. 8, the PDN GW 500 functions as a gateway between the mobile network and the data center.

Figure 9:
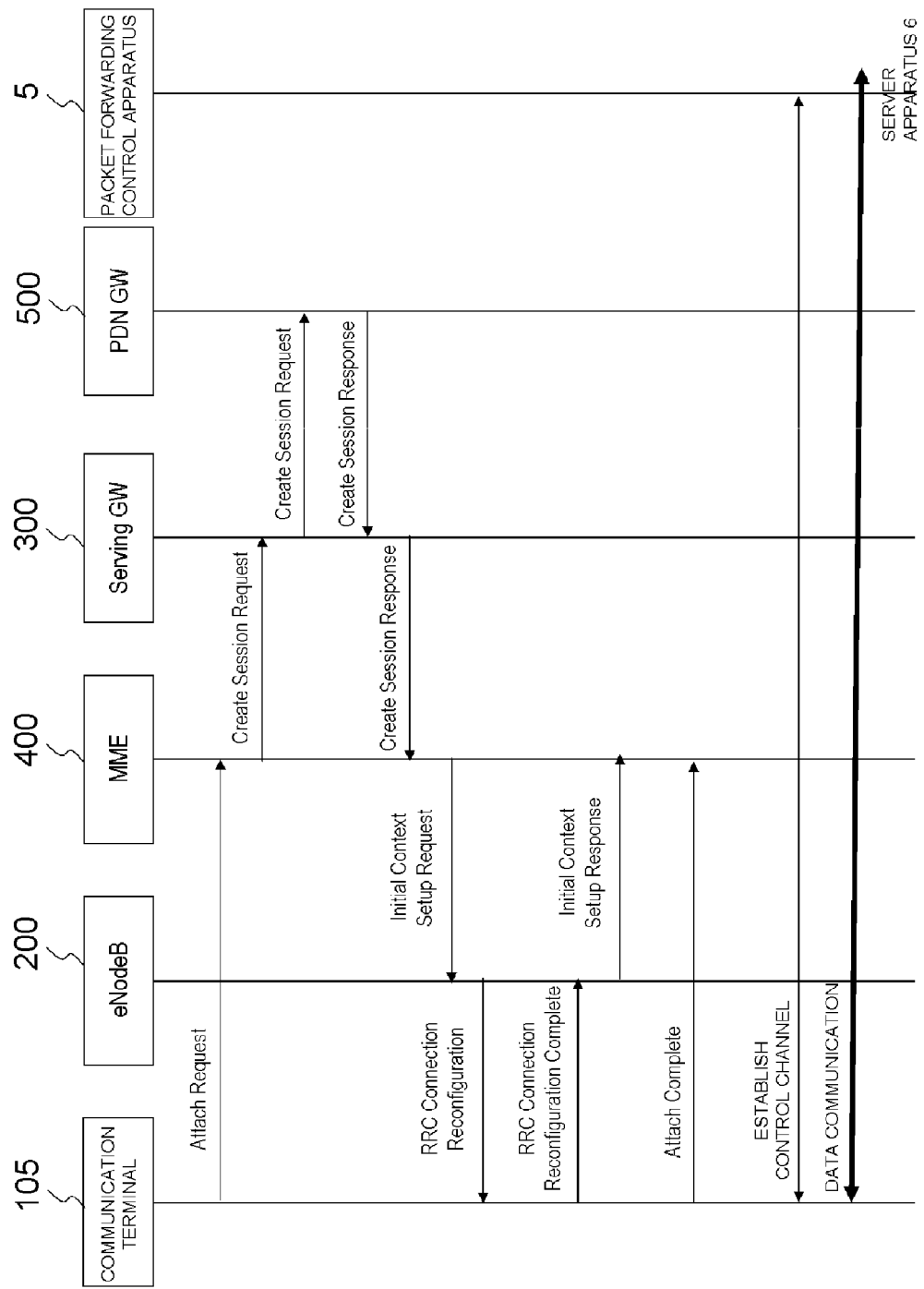
FIG. 9 is a sequence diagram showing an operation example of the communication terminal relating to the fifth exemplary embodiment.

With reference to FIG. 9, an operation example of the communication terminal 105 relating to the present exemplary embodiment will be described. Note that the operation shown in FIG. 9 is an example, and the operation of the present disclosure is not limited to the operation in FIG. 9.

The communication terminal 105 transmits an "Attach Request" to the MME 400. The communication terminal 105 requests a connection to the mobile network managed by the MME 400 with the "Attach Request." The communication terminal 105 includes the request for the address of the packet forwarding control apparatus 5 in the "Attach Request."

Upon receiving the "Attach Request," the MME 400 transmits a Create Session Request to the Serving GW 300. The MME 400 includes the request for the address of the packet forwarding control apparatus 5 in the Create Session Request.

The Serving GW 300 forwards the received Create Session Request to the PDN GW 500.

The PDN GW 500 receives the Create Session Request, generates a Bearer Context, and transmits a Create Session Response to the MME 400 via the Serving GW 300. The PDN GW 500 includes the address of the packet forwarding control apparatus 5 in the Create Session Response. For instance, the PDN GW 500 acquires the address of the packet forwarding control apparatus 5 by means of processing such as communicating with the packet forwarding control apparatus 5 in advance and manages the address.

The MME 400 requests the eNodeB 200 to set up wireless communication with the communication terminal 105 (Initial Context Setup Request) based on the Bearer Context included in the Create Session Response received from the PDN GW 500. The MME 400 includes an Attach Accept message in the Initial Context Setup Request. This Attach Accept message includes the address of the packet forwarding control apparatus 5.

The eNodeB 200 requests the communication terminal 105 to configure wireless communication (RRC Connection Reconfiguration). Further, by including the Attach Accept message received from the MME 400 in the above request, the eNodeB 200 notifies the communication terminal 105 of the address of the packet forwarding control apparatus 5.

The communication terminal 105 notifies that the configuration of the wireless communication has been completed based on the request (RRC Connection Reconfiguration Complete). The communication terminal 105 sets the address of the packet forwarding control apparatus 5 according to the configuration of the wireless communication.

The eNodeB 200 notifies MME 400 that the configuration of the wireless communication has been completed (Initial Context Setup Response).

Next, the communication terminal 105 notifies the MME 400 that the connection to the mobile network has succeeded (Attach Complete).

By means of the procedure described above, the communication terminal 105 establishes the logical channel for connecting to the mobile network and acquires the address of the packet forwarding control apparatus 5.

Next, with reference to FIG. 10, another operation example of the communication terminal 105 relating to the present exemplary embodiment will be described. Note that the operation shown in FIG. 10 is an example, and the operation of the present disclosure is not limited to the operation in FIG. 10.

Figure 10:
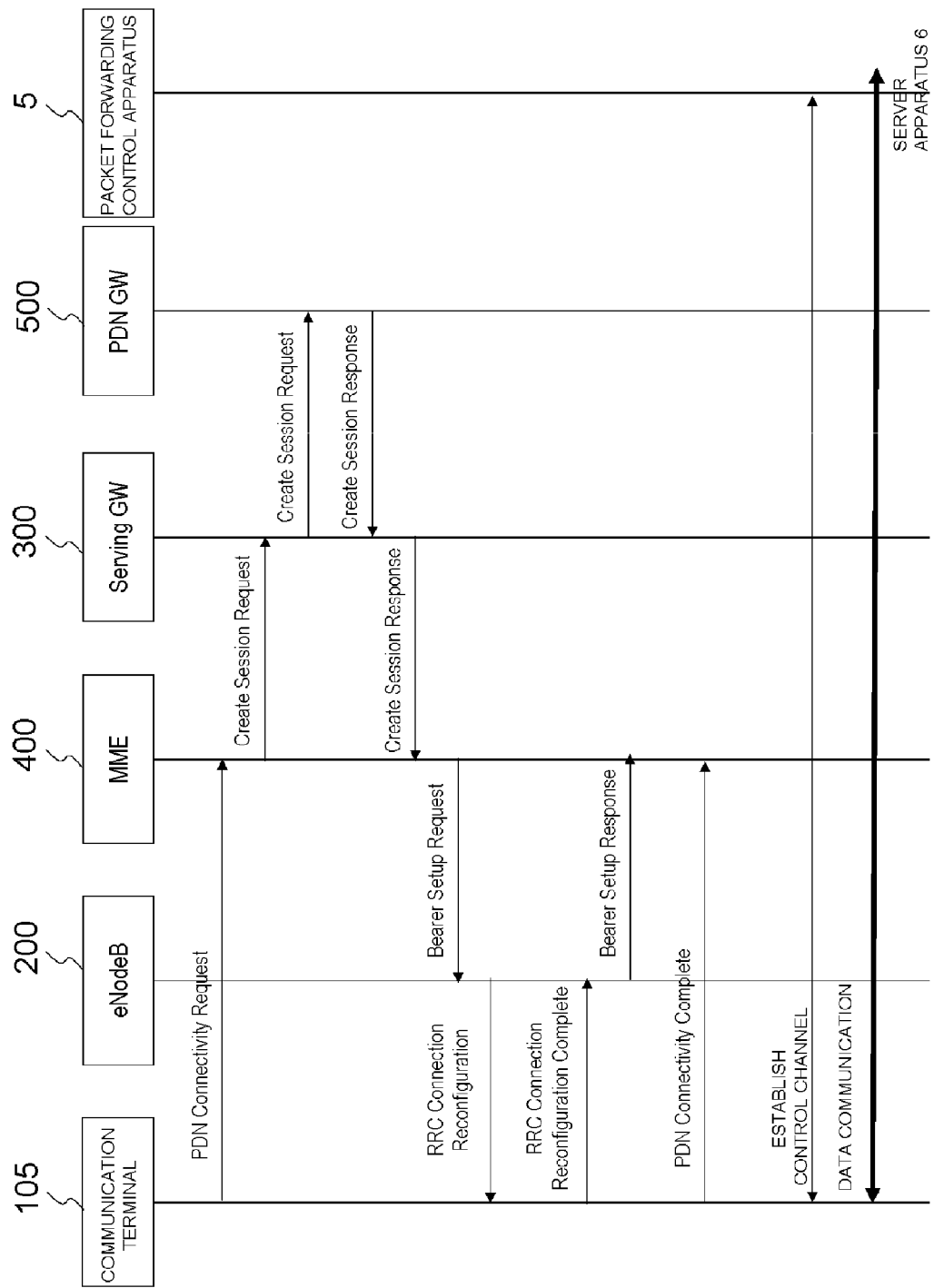
FIG. 10 is a sequence diagram showing an operation example of the communication terminal relating to the fifth exemplary embodiment.

The operation shown in FIG. 10 is an operation after the communication terminal 105 has been connected to the wireless network by means of the operation shown in FIG. 9. The communication terminal 105 includes the request for the address of the packet forwarding control apparatus 5 in the "Attach Request" in FIG. 9. However, the communication terminal 105 may request for the address of the packet forwarding control apparatus 5 in the operation shown in FIG. 10, instead of including the address request in the "Attach Request."

The communication terminal 105 transmits a "PDN Connectivity Request" message to the MME 400 via the eNodeB 200. The "PDN Connectivity Request" is a message that requests another logical channel to be established, in addition to the logical channel established between the communication terminal 105 and the mobile network during the operation of FIG. 9.

The communication terminal 105 includes the request for the address of the packet forwarding control apparatus 5 in the "PDN Connectivity Request."

Upon receiving the "PDN Connectivity Request," the MME 400 transmits a Create Session Request to the Serving GW 300. The MME 400 includes the request for the address of the packet forwarding control apparatus 5 in the Create Session Request.

The Serving GW 300 forwards the received Create Session Request to the PDN GW 500.

The PDN GW 500 receives the Create Session Request, generates a Bearer Context, and transmits a Create Session Response to the MME 400 via the Serving GW 300. The PDN GW 500 includes the address of the packet forwarding control apparatus 5 in the Create Session Response. For instance, the PDN GW 500 acquires the address of the packet forwarding control apparatus 5 by means of processing such as communicating with the packet forwarding control apparatus 5 in advance and manages the address.

The MME 400 requests the eNodeB 200 to set up wireless communication with the communication terminal 105 (Bearer Setup Request) based on the Bearer Context included in the Create Session Response received from the PDN GW 500. The MME 400 includes a PDN Connectivity Accept message in the Bearer Setup Request. This PDN Connectivity Accept message includes the address of the packet forwarding control apparatus 5.

The eNodeB 200 requests the communication terminal 105 to configure wireless communication (RRC Connection Reconfiguration). Further, by including the PDN Connectivity Accept message received from the MME 400 in the above request, the eNodeB 200 notifies the communication terminal 105 of the address of the packet forwarding control apparatus 5.

The communication terminal 105 notifies that the configuration of the wireless communication has been completed based on the request (RRC Connection Reconfiguration Complete). The communication terminal 105 sets the address of the packet forwarding control apparatus 5 according to the configuration of the wireless communication.

The eNodeB 200 notifies MME 400 that the configuration of the wireless communication has been completed (Bearer Setup Response).

Next, the communication terminal 105 notifies the MME 400 that the construction of the logical channel has succeeded (PDN Connectivity Complete).

By means of the procedure described above, the communication terminal 105 establishes the logical channel for connecting to the mobile network and acquires the address of the packet forwarding control apparatus 5.

The exemplary embodiments of the present disclosure have been described above, however, the present disclosure is not limited to the above exemplary embodiments and further modifications, replacements, and adjustments can be added.

Further, each disclosure of Patent Literature and Non Patent Literatures listed above is incorporated herein in its entirety by reference thereto. Modifications and adjustments of the exemplary embodiment(s) are possible within the scope of the overall disclosure (including the claims) of the present disclosure and based on the basic technical concept of the present disclosure. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

2*a*, 2*b*: router apparatus
3*a*, 3*b*: gateway apparatus
4, 4*a*, 4*b*: packet forwarding apparatus
5, 5*a*, 5*b*: packet forwarding control apparatus
6, 6*a*, 6*b*: server apparatus
10: request unit
11: communication unit
12: processing unit
13: processing rule storage unit
20: UTRAN
30: SGSN
40: GGSN
101, 104, 105: communication terminal
200: eNodeB
300: Serving GW
400: MME
500: PDN GW
A, B: communication network
a-1, a-2, b-1, b-2: communication subsystem

The invention claimed is:

1. A communication terminal, which communicates with a network including a plurality of packet forwarding apparatuses that forward a received packet, and a control apparatus that generates a processing rule defining a packet processing method for controlling the plurality of packet forwarding apparatuses, the communication terminal comprising:
- a communication device;
- a memory storing instructions; and
- a processor configured to execute the instructions to:
  - request an address of the control apparatus when requesting for establishing a connection to the network;
  - establish, using the communication device, a communication channel to the control apparatus based on an address acquired by the address request; and
  - process a packet based on a processing rule transmitted by the control apparatus via the communication channel,
- wherein the processor is further configured to execute the instructions to perform at least one of the following:
  - notify whether the communication terminal holds the address;
  - insert into the address request information indicating whether the communication terminal holds the address; or
  - refrain from requesting the address when the communication terminal holds the address.

2. The communication terminal according to claim 1, wherein the processor is further configured to execute the instructions to acquire an address of the control apparatus from a response to a request for establishing a connection to a network.

3. The communication terminal according to claim 1, wherein the processor is further configured to execute the instructions to release the address according to a predetermined condition.

4. The communication terminal according to claim 1, wherein the processor is further configured to execute the instructions to release the address when the communication terminal moves from a first network to a second network.

5. The communication terminal according to claim 1, wherein the processor is further configured to execute the instructions to release the address when the communication terminal disconnects a connection to the network.

6. The communication terminal according to claim 1, wherein the processor is further configured to execute the instructions to determine whether to release the address based on a cause for disconnecting a connection to the network.

7. The communication terminal according to claim 1, wherein the processor is further configured to execute the instructions to release at least one processing rule set by the control apparatus based on a predetermined condition.

8. The communication terminal according to claim 1, wherein the processor releases a processing rule set by a control apparatus that belongs to a first network when the communication terminal moves from the first network to a second network.

9. The communication terminal according to claim 1, wherein the processor is further configured to execute the instructions to release a processing rule set by a control apparatus that belongs to the network when the communication terminal disconnects a connection to the network.

10. The communication terminal according to claim 1, wherein the processor is further configured to execute the instructions to determine whether to release the processing rule based on a cause for disconnecting a connection to the network.

11. A communication method, in which a communication terminal is used that communicates with a network including a plurality of packet forwarding apparatuses that forward a received packet, and a control apparatus that generates a processing rule defining a packet processing method for controlling the plurality of packet forwarding apparatuses, the method comprising:
- requesting an address of the control apparatus when requesting for establishing a connection to the network;
- establishing a communication channel to the control apparatus based on an address acquired by the address request; and
- processing a packet based on a processing rule transmitted by the control apparatus via the communication channel,
- wherein the method further includes at least one of the following:
  - notifying, by the communication terminal, whether the communication terminal holds the address;
  - inserting, by the communication terminal, into the address request information indicating whether the communication terminal holds the address; or
  - refraining, by the communication terminal, from requesting the address when the communication terminal holds the address.

12. The communication method according to claim 11, wherein the communication terminal acquires an address of the control apparatus from a response to a request for establishing a connection to a network.

13. The communication method according to claim 11, wherein the communication terminal releases the address based on a predetermined condition.

14. The communication method according to claim 11, wherein the communication terminal releases the address when the communication terminal moves from a first network to a second network.

15. The communication method according to claim 11, wherein the communication terminal releases the address when the communication terminal disconnects a connection to the network.

16. The communication method according to claim 11, wherein the communication terminal determines whether to release the address based on a cause for disconnecting a connection to the network.

17. The communication method according to claim 11, wherein the communication terminal releases at least one processing rule set by the control apparatus based on a predetermined condition.

18. The communication method according to claim 11, wherein the communication terminal releases a processing rule set by a control apparatus that belongs to a first network when the communication terminal moves from the first network to a second network.

19. The communication method according to claim 11, wherein the communication terminal releases a processing rule set by a control apparatus that belongs to the network when the communication terminal disconnects a connection to the network.

20. The communication method according to claim 11, wherein the communication terminal determines whether to release the processing rule according to a cause for disconnecting a connection to the network.

21. A communication system comprising:
- a network including a plurality of packet forwarding apparatuses that forward a received packet, a control apparatus that generates a processing rule defining a packet processing method for controlling the plurality of packet forwarding apparatuses; and a communication terminal that communicates with the network, the communication terminal comprising:
 a communication device;
 a memory storing instructions; and
 a processor configured to execute the instructions to:
  request an address of the control apparatus when requesting for establishing a connection to the network;
  establish, using the communication device, a communication channel to the control apparatus based on an address acquired by the address request; and
  process a packet based on a processing rule transmitted by the control apparatus via the communication channel,
 wherein the processor is further configured to execute the instructions to perform at least one of the following:
  notify whether the communication terminal holds the address;
  insert into the address request information indicating whether the communication terminal holds the address; or
  refrain from requesting the address when the communication terminal holds the address.

22. A non-transitory computer-readable recording medium, storing a program that, when executed by a computer of a communication terminal that communicates with a network including a plurality of packet forwarding apparatuses that forward a received packet and a control apparatus that generates a processing rule defining a packet processing method for controlling the plurality of packet forwarding apparatuses, causes the computer to execute:
 requesting an address of the control apparatus when requesting for establishing a connection to the network;
 establishing a communication channel to the control apparatus based on an address acquired by the address request; and
 processing a packet based on a processing rule transmitted by the control apparatus via the communication channel,
 wherein execution of the program further causes the computer to execute at least one of the following:
  notifying whether the communication terminal holds the address;
  inserting into the address request information indicating whether the communication terminal holds the address; or
  refraining from requesting the address when the communication terminal holds the address.

* * * * *